(12) United States Patent
Huang (10) Patent No.: US 12,395,241 B2
(45) Date of Patent: Aug. 19, 2025

(54) OLT RECEIVER PARAMETER CONFIGURATION METHOD AND DEVICE, STORAGE MEDIUM AND ELECTRONIC DEVICE

(71) Applicant: ZTE Corporation, Shenzhen (CN)

(72) Inventor: Xingang Huang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 237 days.

(21) Appl. No.: 18/029,412

(22) PCT Filed: Sep. 30, 2021

(86) PCT No.: PCT/CN2021/122174
§ 371 (c)(1),
(2) Date: Mar. 30, 2023

(87) PCT Pub. No.: WO2022/068928
PCT Pub. Date: Apr. 7, 2022

(65) Prior Publication Data
US 2023/0396333 A1 Dec. 7, 2023

(30) Foreign Application Priority Data
Sep. 30, 2020 (CN) .......................... 202011062696.2

(51) Int. Cl.
*H04B 10/079* (2013.01)
*H04B 10/40* (2013.01)
*H04Q 11/00* (2006.01)

(52) U.S. Cl.
CPC ......... *H04B 10/0795* (2013.01); *H04B 10/40* (2013.01); *H04Q 11/0067* (2013.01)

(58) Field of Classification Search
CPC . H04B 10/0795; H04B 10/40; H04Q 11/0067
(Continued)

(56) References Cited

U.S. PATENT DOCUMENTS

2005/0041682 A1    2/2005 Kramer
2008/0056720 A1*   3/2008 Sitton .................. H04J 3/0682
                                                                    398/98
(Continued)

FOREIGN PATENT DOCUMENTS

CN    102124669 A    7/2011
CN    109075861 A   12/2018
(Continued)

OTHER PUBLICATIONS

International Search Report for corresponding application PCT/CN2021/122174 filed Sep. 30, 2021; Mail date Jan. 4, 2022.
(Continued)

*Primary Examiner* — Dalzid E Singh
(74) *Attorney, Agent, or Firm* — CANTOR COLBURN LLP (57) ABSTRACT

Provided is an OLT receiver parameter configuration method and device, a storage medium and an electronic device. The method includes: an OLT performs burst receiving on uplink data transmitted by an ONU, and obtains a receiver parameter corresponding to the ONU; the OLT divides the ONUs into corresponding receiver parameter groups according to the receiver parameters; and the OLT configures the receiver parameters corresponding to the ONU to an OLT receiver, and receives uplink data of the ONU in a burst manner.

19 Claims, 6 Drawing Sheets

(58) Field of Classification Search
USPC .......................................................... 398/205
See application file for complete search history.

(56) References Cited

U.S. PATENT DOCUMENTS

| | | | |
|---|---|---|---|
| 2011/0008043 A1 | 1/2011 | Nomura | |
| 2011/0255866 A1* | 10/2011 | Van Veen | ......... H04B 10/07955 |
| | | | 398/100 |
| 2011/0291766 A1* | 12/2011 | Mashimo | ................ H03F 1/083 |
| | | | 330/308 |
| 2016/0173205 A1* | 6/2016 | Noda | ................... H04B 10/272 |
| | | | 398/202 |

FOREIGN PATENT DOCUMENTS

| | | | | |
|---|---|---|---|---|
| CN | 110086545 A | * | 8/2019 | ............. H04B 10/25 |
| CN | 112492412 A | | 3/2021 | |
| EP | 3780646 A1 | | 2/2021 | |
| EP | 3836430 A1 | | 6/2021 | |
| JP | 2017152773 A | | 8/2017 | |
| WO | 2020051753 A1 | | 3/2020 | |

OTHER PUBLICATIONS

European Search Report for corresponding application EP 2187 4582; Dated Feb. 26, 2024.

* cited by examiner

OLT RECEIVER PARAMETER CONFIGURATION METHOD AND DEVICE, STORAGE MEDIUM AND ELECTRONIC DEVICE

CROSS-REFERENCE TO RELATED APPLICATION

This disclosure is based on Chinese patent application CN 202011062696.2 filed on 30 Sep. 2020 and entitled "OLT RECEIVER PARAMETER CONFIGURATION METHOD AND DEVICE, STORAGE MEDIUM AND ELECTRONIC DEVICE", and claims priority to Chinese patent application, the disclosure of which is incorporated herein by reference in its entirety.

TECHNICAL FIELD

Embodiments of the present disclosure relate to the field of optical communications, and in particular, to an Optical Line Terminal (OLT) receiver parameter configuration method and device, storage medium and electronic device.

BACKGROUND

A Passive Optical Network (PON) is a point-to-multipoint tree network structure. Because the PON has features such as a simple network structure, optical fiber resource sharing, a low cost, and no need to install an original device externally, the PON is recognized as the most promising optical fiber access technology.

A PON system adopts Time Division Multiple Access (TDMA) on the uplink, an Optical Network Unit (ONU) sends burst data on the uplink, sends data in an authorized time slot, and closes uplink sending in an unauthorized time slot. The signal power and transmission distances from different ONUs to an OLT optical receiver are different, and device parameters of various ONU transmitters are also different; and the OLT needs to perform trans-impedance gain adjustment, clock recovery, and equalization parameter convergence on each arrived ONU signal so as to normally receive uplink data sent by various ONUs, which result in long burst reception recovery time of the OLT, long preamble needs to be sent by the ONU, large transmission overhead, and low uplink transmission efficiency.

For the problems in the related art that the burst reception and recovery time of the OLT is long, the ONU needs to send a long preamble, the transmission overhead is large, and the uplink transmission efficiency is low, no effective solution has been proposed at present.

SUMMARY

Embodiments of the present disclosure provide a OLT receiver parameter configuration method and device, storage medium and electronic device, so as to at least solve the problems in the related art that burst receiving and recovery time of an OLT is long, an ONU needs to send a long preamble, the transmission overhead is large, and the uplink transmission efficiency is low.

According to an embodiment of the present disclosure, provided is a parameter configuration method for an OLT receiver, which includes: an optical line terminal (OLT) receives burst uplink data sent by an optical network unit (ONU), and obtains a receiver parameter corresponding to the ONU; divides the ONUs into corresponding receiver parameter groups according to the receiver parameters; configures the receiver parameters corresponding to the ONU to the OLT receiver, and receives uplink data of the ONU in a burst manner.

In an exemplary embodiment, the step of the OLT divides the ONUs into the corresponding receiver parameter groups according to the receiver parameters further includes: the OLT divides the ONUs into the corresponding receiver parameter groups according to the receiver parameters determined after the OLT receiver convergence.

In an exemplary embodiment, after the OLT divides the ONUs into the corresponding receiver parameter groups according to the receiver parameters determined after the receiver convergence, the method further include: the OLT receiver sends the group number of the receiver parameters to the OLT MAC.

In an exemplary embodiment, the step of the OLT receiver sends the group number of the receiver parameter to the OLT MAC may include one of the following: the OLT receiver inserts the group number of the receiver parameter into a preamble sequence, and sends the preamble sequence to the OLT MAC; the OLT receiver sends a first indication signal to the OLT MAC, wherein the first indication signal indicates a group number corresponding to the ONU of which uplink data arrives the OLT MAC.

In an exemplary embodiment, after the OLT receiver sends the group number of the receiver parameter to the OLT MAC, the method can further include: the OLT MAC extracts the group number and the ONU ID, and store a corresponding relationship between the group number and the ONU ID in a MAC register.

In an exemplary embodiment, the step of the OLT configures the receiver parameter corresponding to the ONU to an OLT receiver may include: the OLT MAC acquires, according to a DBA, a group number of the ONU of which uplink data reaches the OLT receiver; the OLT MAC sends corresponding receiver parameter information to the OLT receiver after the uplink data transmission of a previous ONU or a group of ONUs ends and before the uplink data transmission of a next ONU or a next group of ONUs arrives; and the OLT receiver make the configuration of one or a goup of corresponding receiver parameters take effect according to the receiver parameter information.

In an exemplary embodiment, the step of the OLT configuring the receiver parameters corresponding to the ONUs to an OLT receiver may include: the OLT schedules the DBA, so that uplink data of each ONU group arrives at the OLT receiver in a predetermined order; the OLT MAC sends a second indication signal to the OLT receiver to indicate the OLT receiver to change receiver parameters of each ONU group in a predetermined order; and the OLT receiver make the receiver parameter configuration of the next group of ONUs take effect according to the second indication signal.

In an exemplary embodiment, the receiver parameter of the ONU may include at least one of the following: a Trans-Impedance Amplifier (TIA) Automatic Gain Control (AGC) gain, a TIA Variable Gain Amplifier (VGA) gain, a Burst Clock Data Recovery (BCDR) phase parameter, and an equalizer tap coefficient.

According to another embodiment of the present disclosure, an OLT is provided, which includes: an OLT receiver, configured to perform burst reception on uplink data transmitted by an optical network unit (ONU), obtain a receiver parameter corresponding to the ONU, and divide the ONU into corresponding receiver parameter groups according to the receiver parameter; and an OLT MAC, configured to configure the receiver parameters corresponding to the ONU to the OLT receiver, and receive uplink data of the ONU in a burst manner.

In an exemplary embodiment, the OLT receiver is further configured to send a group number of the receiver parameter to the OLT MAC.

In an exemplary embodiment, the OLT receiver sends the group number by one of the following manners: inserting the group number of the receiver parameter into a preamble sequence of uplink data and sending same to the OLT MAC; transmitting a first indication signal to the OLT MAC, wherein the first indication signal indicates the group number corresponding to the ONU of which uplink data arrives at the OLT MAC.

In an exemplary embodiment, the first indication signal is sent through one of the following interfaces: an Inter-Integrated Circuit (I2C) interface, a Management Data Input/Output (MDIO) interface, a self-defined interface and an indication pin.

In an exemplary embodiment, the OLT MAC is further configured to extract the group number and the ONU ID, and store a corresponding relationship between the group number and the ONU ID in a MAC register.

In an exemplary embodiment, the OLT MAC is further configured to acquire, according to the DBA, the group number of the ONU of which the uplink data arrives at the OLT receiver, and after the uplink data transmission of a previous ONU or a group of ONUs ends, and before the uplink data transmission of a next ONU or a group of ONUs arrives, send corresponding receiver parameter information to the OLT receiver; the OLT receiver is further configured to make the corresponding configuration of one or a group of receiver parameters take effect according to the receiver parameter information.

In an exemplary embodiment, the OLT MAC is further configured to, by scheduling the DBA, enable the uplink data of each ONU group to arrive at the OLT receiver in a predetermined order, and send a second indication signal to the OLT receiver to indicate the OLT receiver to change a receiver parameter of each ONU group in the predetermined order; and the OLT receiver is further configured to make the receiver parameter configuration for a next group of ONUs take effect according to the second indication signal.

In an exemplary embodiment, the receiver parameter of the ONU includes at least one of: a TIA AGC gain, a TIA VGA gain, a BCDR phase parameter, and an equalizer tap coefficient.

In an exemplary embodiment, the receiver parameter group is stored in a look-up table of the OLT receiver, or stored in a look-up table of the OLT MAC, or stored in a look-up table of a register, which can be read and written by the OLT MAC, on a system board of the OLT.

According to yet another embodiment of the present disclosure, also provided is a computer readable storage medium. The computer readable storage medium stores a computer program, when the computer program is executed by a processor, cause the processor to implement the steps in the above method embodiments.

According to yet another embodiment of the present disclosure, also provided is an electronic device, which includes a memory and a processor, wherein the memory stores a computer program, and the processor is configured to execute the computer program so as to implement the steps in the above described method embodiments.

Through the above embodiments of the present disclosure, before receiving the ONU data, the OLT configures the corresponding parameters to the OLT receiver in advance. After the ONU data arrives at the OLT receiver, the OLT can receive the uplink data only through fine adjustment, even without any adjustments, thereby accelerating the recovery time of the uplink burst reception and reducing the preamble overhead.

DETAILED DESCRIPTION OF THE EMBODIMENTS

Hereinafter, embodiments of the present disclosure will be described in detail with reference to the accompanying drawings and in conjunction with the embodiments.

It should be noted that, terms such as "first" and "second" in the description, claims, and the accompanying drawings of the present disclosure are used to distinguish similar objects, but are not necessarily used to describe a specific sequence or order.

Figure 1:
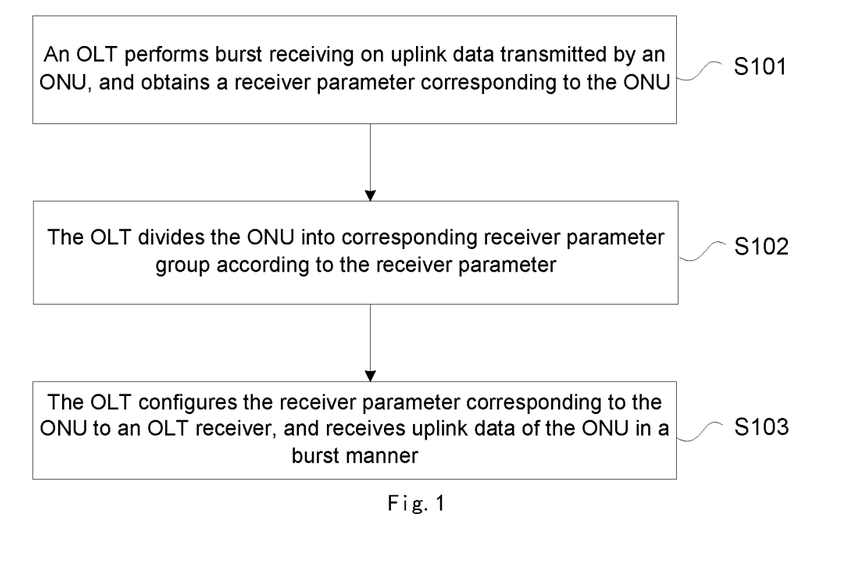
FIG. 1 is a flowchart of a method for configuring parameters of an OLT receiver according to an embodiment of the present disclosure.

The present embodiment provides a method for configuring parameters of an OLT receiver. FIG. 1 is a flowchart of a method for configuring parameters of an OLT receiver according to an embodiment of the present disclosure. As shown in FIG. 1, the flow includes the following steps:

Step S101, an optical line terminal (OLT) performs burst receiving on uplink data sent by an optical network unit (ONU), and obtains a receiver parameter corresponding to the ONU.

Step S102, the OLT divides the ONUs into corresponding receiver parameter groups according to the receiver parameters.

Step S103, the OLT configures the receiver parameters corresponding to the ONU to an OLT receiver, and receives uplink data of the ONU in a burst manner.

In this embodiment, step S102 may include: dividing the ONUs into the corresponding receiver parameter groups according to the receiver parameters determined after the OLT receiver convergence.

In this embodiment, after dividing the ONUs into the corresponding receiver parameter groups according to the receiver parameters determined after the receiver convergence, the method can further include: the OLT receiver sends the group number of the receiver parameters to an OLT MAC.

In this embodiment, the step of the OLT receiver sends the group number of the receiver parameter to the OLT MAC include one of the following: the OLT receiver inserts the group number of the receiver parameter into a preamble sequence, and sends the preamble sequence to the OLT MAC; the OLT receiver sends a first indication signal to the OLT MAC, wherein the first indication signal indicates a group number corresponding to the ONU of which uplink data arrives the OLT MAC.

In this embodiment, after the OLT receiver sends the group number of the receiver parameter to the OLT MAC, the method further include: the OLT MAC extracts the group number and the ONU ID, and stores a corresponding relationship between the group number and the ONU ID in a MAC register.

In this embodiment, step S103 may includes: the OLT MAC acquires, according to the DBA, the group number of the ONU of which the uplink data arrives at the OLT receiver; the OLT MAC sends corresponding receiver parameter information to the OLT receiver after the uplink data transmission of a previous ONU or a group of ONUs ends and before the uplink data transmission of a next or a group of ONUs arrives; and the OLT receiver make the configuration of one or a group of corresponding receiver parameters take effect according to the receiver parameter information.

In this embodiment, step S103 may include: the OLT enables the uplink data of each ONU group to arrive at the OLT receiver in a predetermined order by scheduling the DBA; the OLT MAC sends a second indication signal to the OLT receiver to indicate the OLT receiver to change receiver parameters of each ONU group in a predetermined order; and the OLT receiver make the configuration of the receiver parameter of the next group of ONUs take effect according to the second indication signal.

In this embodiment, the receiver parameter of the ONU may include at least one of the following: a TIA AGC gain, a TIA VGA gain, a BCDR phase parameter, and an equalizer tap coefficient.

By means of the described steps, after data of an ONU arrives at an OLT receiver, the OLT only needs to perform fine adjustment, even does not need to perform any adjustments, and can receive uplink data. The problems in the related art that burst reception and recovery time of an OLT is long, an ONU needs to send a long preamble, the transmission overhead is large, and the uplink transmission efficiency is low are solved, and the effects of accelerating the uplink burst reception and recovery time and reducing the preamble overhead are achieved.

Through the description of the foregoing embodiments, a person skilled in the art may clearly understand that the method according to the foregoing embodiments may be implemented by software in addition to a necessary universal hardware platform, and definitely may also be implemented by hardware. However, in many cases, the former is a preferred implementation. Based on such understanding, the technical solutions of the present disclosure essentially or the part contributing to the prior art may be embodied in the form of a software product. The computer software product is stored in a storage medium (such as a ROM/RAM, a magnetic disk, and an optical disk), and includes several instructions for instructing a terminal device (which may be a mobile phone, a computer, a server, a network device, or the like).

A device for configuring parameters of an OLT receiver is also provided in the present embodiment. The device is used for implementing the described embodiments and preferred implementations, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

Figure 2:
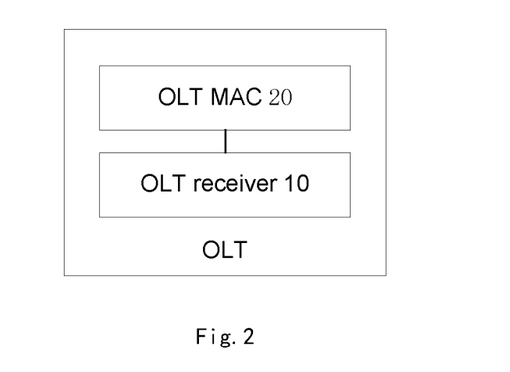
FIG. 2 is a structure block diagram of an OLT according to an embodiment of the present disclosure.

FIG. 2 is a structural block diagram of an OLT according to an embodiment of the present disclosure. As shown in FIG. 2, the OLT includes an OLT receiver 10 and an OLT MAC 20.

The OLT receiver 10 is configured to perform burst receiving on uplink data sent by an optical network unit (ONU), obtain a receiver parameter corresponding to the ONU, and divide the ONU into corresponding receiver parameter groups according to the receiver parameter.

The OLT MAC 20 is configured to configure the receiver parameters corresponding to the ONU to the OLT receiver, and receive uplink data of the ONU in a burst manner.

In this embodiment, the OLT receiver 10 is further configured to send the group number of the receiver parameter to the OLT MAC 20.

In this embodiment, the OLT receiver 10 sends the group number in one of the following manners: inserting the group number of the receiver parameter into a preamble sequence of uplink data and sending the same to the OLT MAC 20; sending a first indication signal to the OLT MAC wherein the first indication signal indicates the group number corresponding to the ONU that uplink data reaches the OLT MAC 20.

In this embodiment, the first indication signal is sent through one of the following interfaces: an I2C interface, an MDIO interface, a customized interface, and an indication pin.

In this embodiment, the OLT MAC 20 is further configured to extract the group number and the ONU ID, and store a corresponding relationship between the group number and the ONU ID in a MAC register.

In this embodiment, the OLT MAC 20 is further configured to acquire, according to the DBA, the group number of the ONU of which the uplink data arrives at the OLT receiver 10, and after the transmission of the uplink data of the previous ONU or a group of ONUs ends, and before the transmission of the uplink data of the next ONU or a group of ONUs arrives, send corresponding receiver parameter information to the OLT receiver 10; the OLT receiver is further configured to validate a corresponding parameter configuration or a group of receiver parameters according to the receiver parameter information.

In this embodiment, the OLT MAC 20 is further configured to schedule the DBA, so that the uplink data of each ONU group arrives at the OLT receiver according to a predetermined sequence, and send a second indication signal to the OLT receiver 10 to indicate the OLT receiver 10 to change the receiver parameters of each ONU group according to the predetermined sequence; and the OLT receiver 10 is further configured to take effect the receiver parameter configuration of the next group of ONUs according to the second indication signal.

In this embodiment, the receiver parameter of the ONU includes at least one of the following: a TIA AGC gain, a TIA VGA gain, a BCDR phase parameter, and an equalizer tap coefficient.

In this embodiment, the receiver parameter group is stored in a look-up table of the OLT receiver 10, or stored in a look-up table of the OLT MAC 20, or stored in a look-up table of a register that can be read and written by the OLT MAC 20 on a system board of the OLT.

It should be noted that, functional modules of the OLT may be implemented by software or hardware. The latter may be implemented in the following manner, but is not limited thereto: functional modules are all located in a same processor; or the foregoing functional modules are located in different processors in an arbitrary combination form.

To facilitate understanding of the technical solutions provided in the present disclosure, the following describes the technical solutions in detail with reference to embodiments of specific scenarios.

This embodiment provides a fast adaptive burst receiving method to solve the problem of high uplink preamble overhead of the PON system. The specific method is that ONUs are divided into N groups, and each group of ONUs corresponds to a group of OLT receiver parameters, which specifically include a trans-impedance gain, a clock frequency, a phase, an equalization coefficient, and the like. Before receiving the ONU data, the OLT pre-configures corresponding parameters to the OLT receiver. After the ONU data arrives at the OLT receiver, the OLT can receive the uplink data only through fine adjustment or without adjustment, thereby accelerating the recovery time of the uplink burst reception and reducing the preamble overhead.

Figure 3:
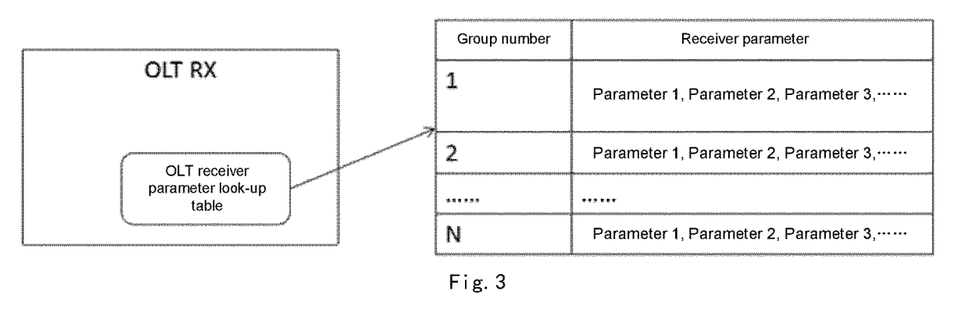
FIG. 3 is a schematic diagram of a lookup table stored in an OLT receiver according to an optional embodiment of the present disclosure.

Embodiment 1, FIG. 3 is a schematic diagram of a look-up table stored in an OLT receiver according to an optional embodiment of the present disclosure. As shown in FIG. 3, specific values of N groups of receiver parameters may be a look-up table stored in the OLT receiver.

In the registration phase, the OLT performs burst reception on the received ONU data to obtain the receiver parameters corresponding to the ONU. The ONU is classified into the corresponding receiver parameter group according to the receiver parameter determined after the convergence of the receiver. The OLT receiver sends the determined corresponding group number to the OLT MAC.

Figure 4:
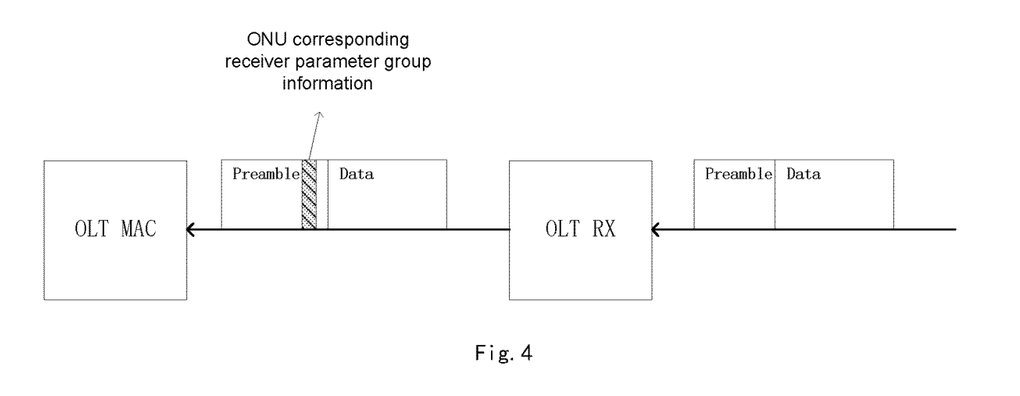
FIG. 4 is a schematic diagram of an OLT receiver inserting a group number in a preamble according to an optional embodiment of the present disclosure.

Specifically, FIG. 4 is a schematic diagram of an OLT receiver inserting a group number into a preamble sequence according to an optional embodiment of the present disclosure. As shown in FIG. 4, the OLT receiver inserts the group number into the preamble sequence, and after receiving uplink data of the ONU, an OLT MAC extracts the group number and an ONU ID, and stores the correspondence in a MAC register for quick recovery in a working stage.

Figure 5:
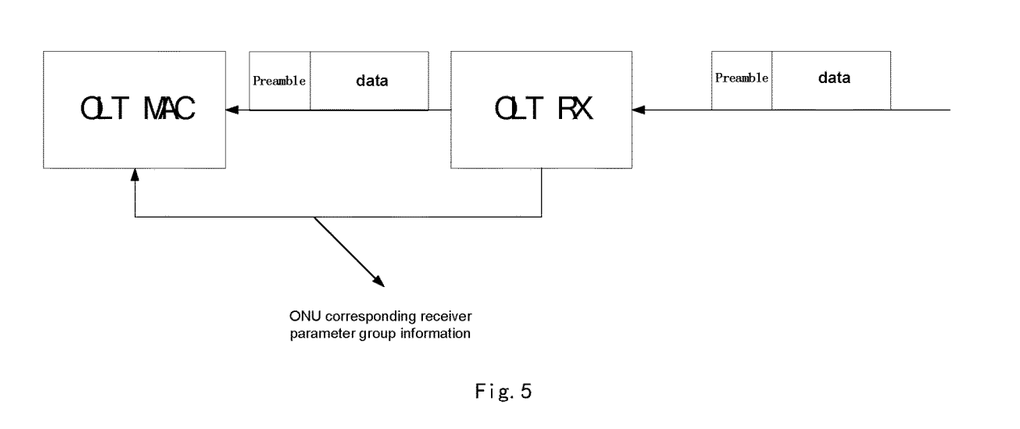
FIG. 5 is a schematic diagram of an OLT receiver for sending an indication signal to an OLT MAC according to an optional embodiment of the present disclosure.

Specifically, FIG. 5 is a schematic diagram of an OLT receiver for sending an indication signal to an OLT MAC according to an optional embodiment of the present disclosure. As shown in FIG. 5, the OLT receiver sends the indication signal to the OLT MAC, and the indication signal indicates a group number corresponding to an ONU reaching the OLT MAC. The indication signal may be through an I2C interface or a dedicated indication signal pin.

In a working phase, the OLT pre-configures the receiver parameters of the corresponding ONU to the OLT receiver, and after the data of the ONU arrives, the data can be quickly converged, thereby realizing fast burst receiving.

Figure 6:
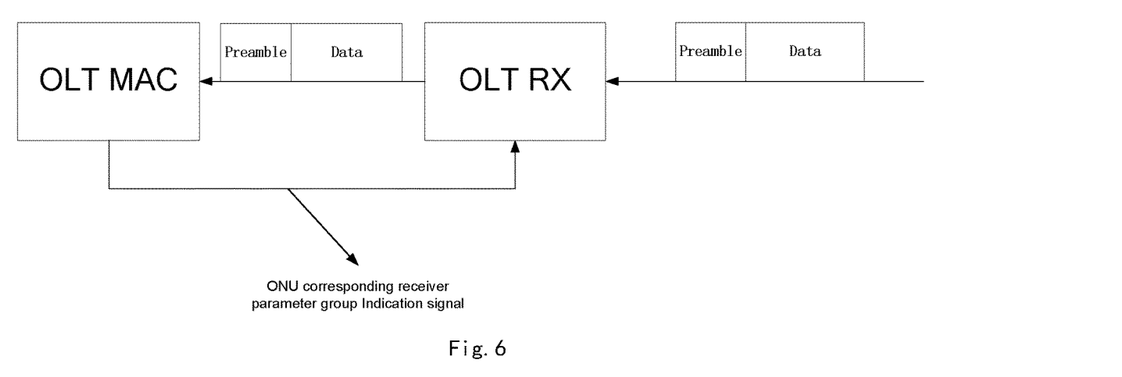
FIG. 6 is a graph illustrating an OLT MAC for an OLT receiver corresponding to a group indication signal, according to an embodiment of the disclosure.

Specifically, FIG. 6 is a schematic diagram of an OLT MAC corresponding to a group indication signal for an OLT receiver according to an optional embodiment of the present disclosure. As shown in FIG. 6, the OLT MAC may know, according to a DBA, the group in which an ONU arriving at the receiver is located. After the data of one previous ONU or a group of previous ONUs, and before the next ONU or the next group of ONU data arrives, the OLT MAC sends a corresponding group indication signal to the OLT receiver, and the OLT receiver makes the configuration corresponding to the next one or next group of receivers parameters take effect according to the indication signal. The indication signal may be transmitted via an I2C interface or a dedicated indication signal pin.

Figure 7:
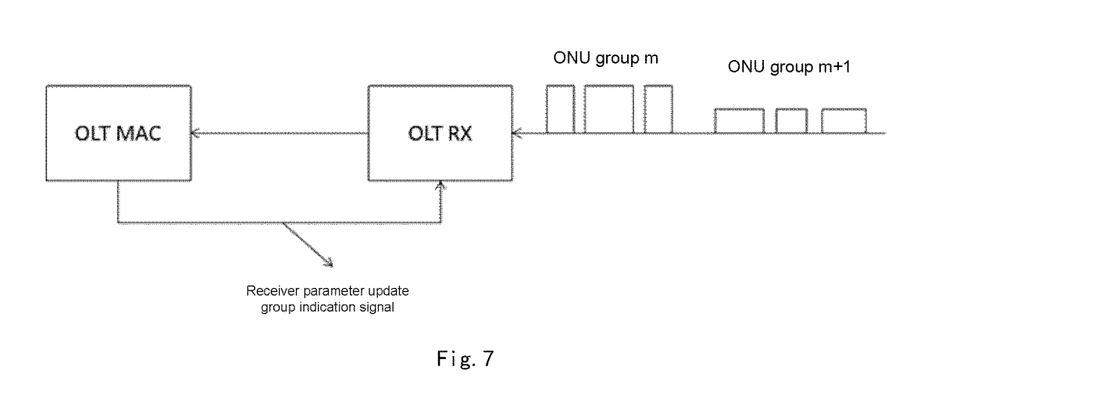
FIG. 7 is a schematic diagram of an OLT MAC that indicates to an OLT receiver an indication signal to update receiver parameters according to an optional embodiment of the present disclosure.

Specifically, FIG. 7 is a schematic diagram of an OLT MAC indicating to an OLT receiver an indication signal for updating a receiver parameter according to an optional embodiment of the present disclosure. As shown in FIG. 7, the OLT schedules, through DBA, ONU groups arriving at the OLT receiver according to a fixed order, for example, a first group of ONUs, a second group of ONUs, . . . , an Nth group of ONUs, a first group of ONUs, a second group of ONUs, . . . . The OLT MAC indicates to the OLT receiver an indication signal for updating a receiver parameter, and the indication signal may be an indication signal such as a pulse signal or a level jump signal. After receiving the indication signal, the OLT receiver configures and makes the next group of receiver parameters take effect.

Embodiment 2, FIG. 3 is a schematic diagram of a lookup table stored in an OLT receiver according to an optional embodiment of the present disclosure. As shown in FIG. 3, specific values of N groups of receiver parameters may be a lookup table stored in an OLT receiver, which may include a TIA AGC gain, a TIA VGA gain, a BCDR phase parameter, an equalizer tap coefficient, and the like.

In the registration phase, the OLT performs burst reception on the received ONU data, and obtains receiver parameters corresponding to the ONU, and the receiver parameters may include a TIA AGC gain, a TIA VGA gain, a BCDR phase parameter, an equalizer tap coefficient, and the like. The ONU is classified into the corresponding receiver parameter group according to the receiver parameter determined after the convergence of the receiver. The OLT receiver sends the determined corresponding group number to the OLT MAC.

Specifically, FIG. 4 is a schematic diagram of an OLT receiver inserting a group number into a preamble sequence according to an optional embodiment of the present disclosure. As shown in FIG. 4, the OLT receiver inserts the group number into the preamble sequence, and after receiving uplink data of the ONU, an OLT MAC extracts the group number and an ONU ID, and stores the correspondence in a MAC register for quick recovery in a working stage.

Specifically, FIG. 5 is a schematic diagram of an OLT receiver for sending an indication signal to an OLT MAC according to an optional embodiment of the present disclosure. As shown in FIG. 5, the OLT receiver sends the indication signal to the OLT MAC, and the indication signal indicates a group number corresponding to an ONU reaching the OLT MAC. The indication signal can be transmitted via an I2C, an MDIO interface, or a self-defined interface or an indication pin.

Figure 8:
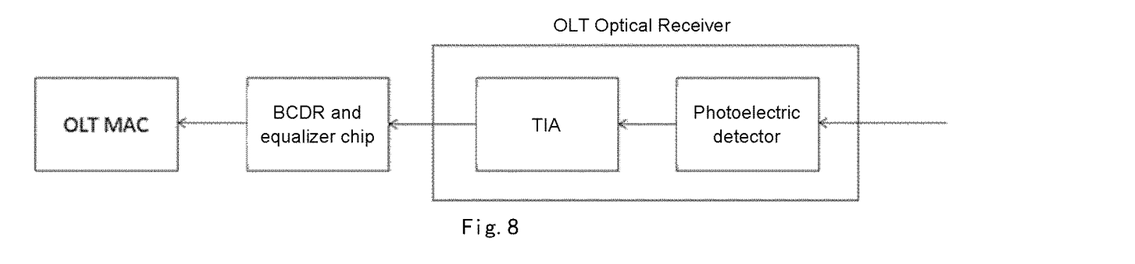
FIG. 8 is a schematic diagram of an independent BCDR and equalizer integrated chip according to an optional embodiment of the present disclosure.
Figure 9:
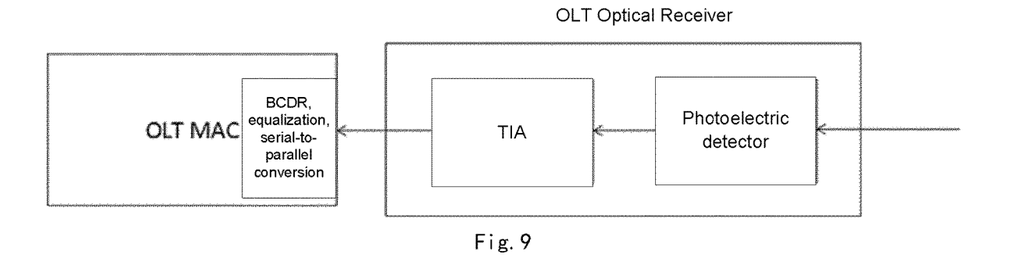
FIG. 9 illustrates a BCDR and equalizer integrated chip integrated with a MAC chip according to an optional embodiment of the present disclosure.

In this embodiment, FIG. 8 is a schematic diagram of an independent BCDR and equalizer integrated chip according to an optional embodiment of the present disclosure, FIG. 9 illustrates a BCDR and equalizer integrated chip integrated with a MAC chip according to an alternative embodiment of the present disclosure. As shown in FIGS. 8 and 9, the TIA in the OLT receiver is in the optical receiver of the OLT optical module, and the BCDR and the equalizer may be independent chips integrated together, or integrated with the MAC chip to implement serial-parallel conversion.

In a working phase, the OLT pre-configures the receiver parameters of the corresponding ONU to the OLT receiver, and after the data of the ONU arrives, the data can be quickly converged, thereby the fast burst reception of data is realized.

Specifically, FIG. 6 is a schematic diagram of an OLT MAC corresponding to a group indication signal for an OLT receiver according to an optional embodiment of the present disclosure. As shown in FIG. 6, the OLT MAC may know, according to a DBA, the group in which an ONU arriving at the receiver is located. After the previous one or a group of ONU data ends, and before the next or a group of ONU data arrives, the OLT MAC sends a corresponding group indication signal to the OLT receiver, and the OLT receiver makes, according to the indication signal, the corresponding configuration of the next one or the next group of receivers parameter take effect t, wherein the receivers parameter may include a TIA AGC gain, a TIA VGA gain, a BCDR phase parameter, an equalizer tap coefficient, etc. The indication signal may be transmitted through I2C, an MDIO interface, or a self-defined interface or an indication pin.

Specifically, FIG. 7 is a schematic diagram of an OLT MAC indicating to an OLT receiver an indication signal for updating a receiver parameter according to an optional embodiment of the present disclosure. As shown in FIG. 7, the OLT schedules, through DBA, ONU groups arriving at the OLT receiver according to a fixed order, for example, a first group of ONUs, a second group of ONUs, . . . , an Nth group of ONUs, a first group of ONUs, a second group of ONUs, . . . . The OLT MAC indicates to the OLT receiver an indication signal for updating a receiver parameter, and the indication signal may be an indication signal such as a pulse signal or a level jump signal. After receiving the indication signal, the OLT receiver configures and makes the next group of receiver parameters take effect.

Figure 10:
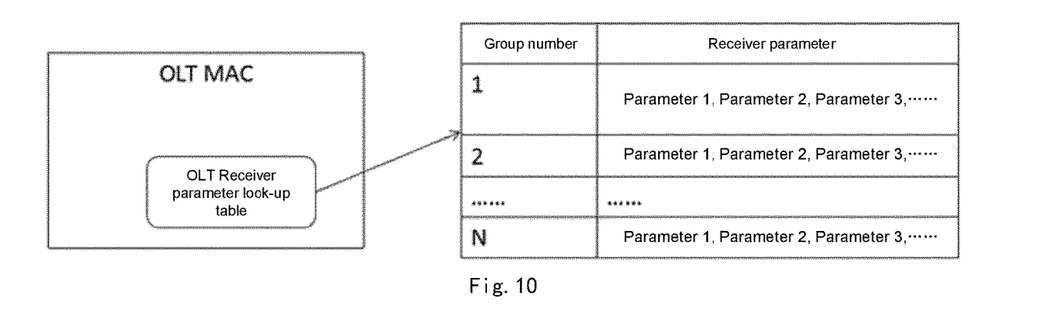
FIG. 10 is a schematic diagram of specific values of N groups of receiver parameters stored in OLT MAC according to an optional embodiment of the present disclosure.

Embodiment 3, FIG. 10 is a schematic diagram of N groups of receiver parameter specific values stored in an OLT MAC according to an optional embodiment of the present disclosure. As shown in FIG. 10, the N groups of receiver parameter specific values may be a look-up table stored in a register, which can be read and written by an OLT MAC or a MAC, on a system board.

In the registration phase, the OLT performs burst reception on the received ONU data to obtain the receiver parameters corresponding to the ONU. The OLT receiver sends the receiver parameter determined after convergence to the OLT MAC. The OLT MAC divides the ONUs into corresponding receiver parameters according to the received receiver parameters.

Figure 11:
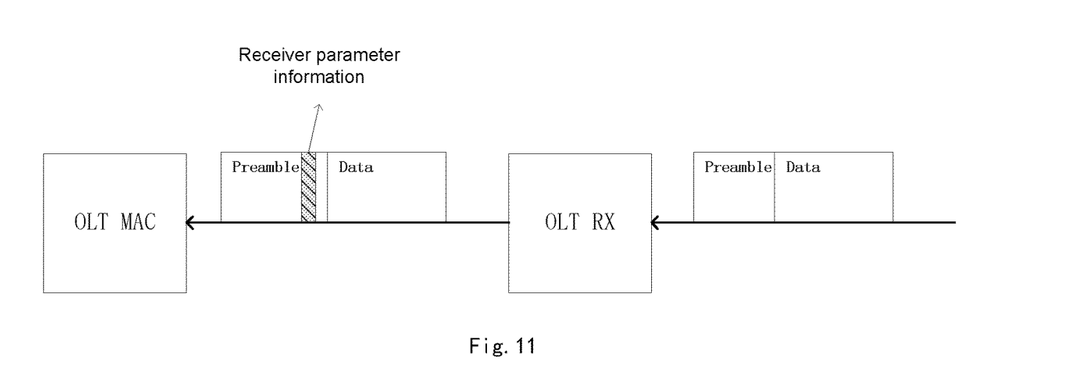
FIG. 11 is a schematic diagram of an OLT receiver inserting receiver parameter information in a preamble sequence according to an optional embodiment of the present disclosure.

Specifically, FIG. 11 is a schematic diagram of an OLT receiver inserting receiver parameter information in a preamble sequence according to an optional embodiment of the present disclosure. As shown in FIG. 11, an OLT receiver inserts receiver parameter information in a preamble sequence, and after receiving uplink data of an ONU, an OLT MAC extracts the receiver parameter information and an ONU ID, determines an ONU group, and stores a corresponding relationship in an MAC register for quick recovery in a working stage.

Figure 12:
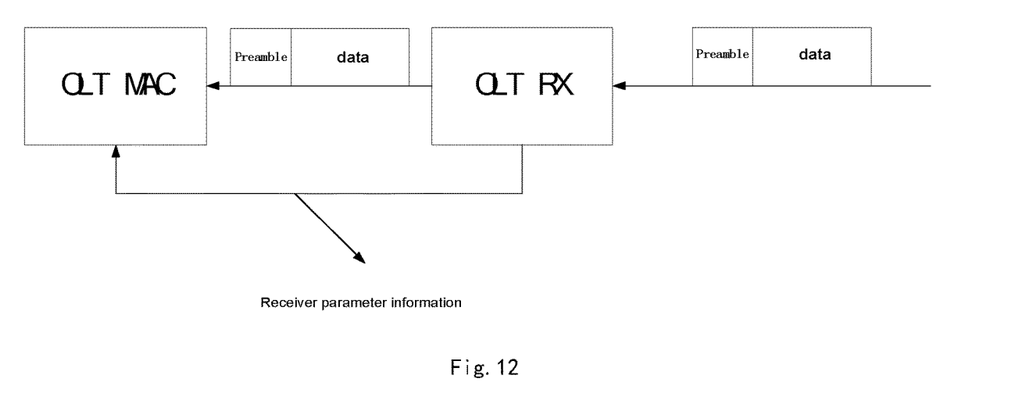
FIG. 12 is a block diagram of an OLT receiver that transmits receiver parameter information to an OLT MAC according to an embodiment of the present disclosure.

Specifically, FIG. 12 is a schematic diagram of an OLT receiver for sending receiver parameter information to an OLT MAC according to an optional embodiment of the present disclosure. As shown in FIG. 12, the OLT receiver sends an indication signal to the OLT MAC, the indication signal indicating the receiver parameter information corresponding to the ONU has reached the OLT MAC. The indication signal may be transmitted through an I2C interface or a dedicated indication signal pin.

In a working phase, the OLT pre-configures the receiver parameters of the corresponding ONU to the OLT receiver, and after the data of the ONU arrives, the data can be quickly converged, thereby the fast burst reception on data is realized.

Figure 13:
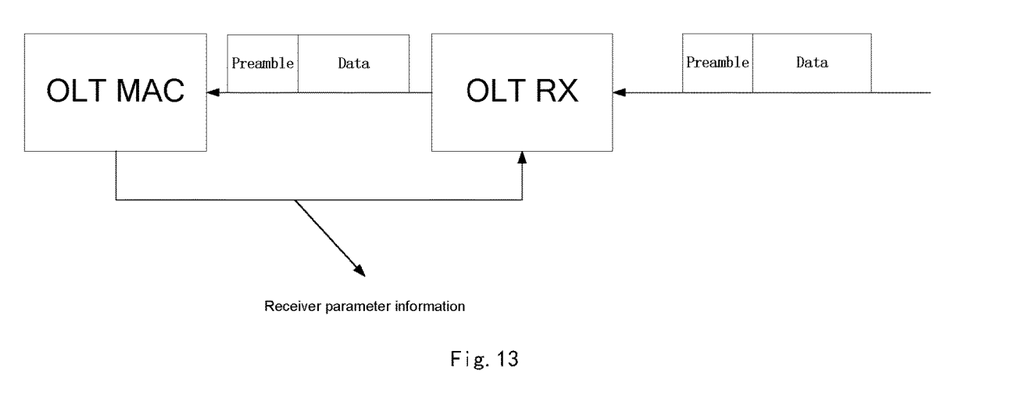
FIG. 13 is a schematic diagram of an OLT MAC sending the corresponding receiver parameter information to an OLT receiver according to an optional embodiment of the present disclosure.

Specifically, FIG. 13 is a schematic diagram of an OLT MAC corresponding to parameter information of a receiver to an OLT receiver according to an optional embodiment of the present disclosure. As shown in FIG. 13, the OLT MAC can know, according to DBA, the group in which an ONU reaching the receiver is located. After one or a group of the ONU data has been sent by the OLT MAC, the next or a group of the ONU data arrives at the OLT MAC, the OLT MAC sends receiver parameter information corresponding to the ONU data to the OLT receiver, and the OLT receiver makes the receiver parameter configuration corresponding to the next one or the next group of the ONU data take effect according to the receiver parameter information. The receiver parameter information may be transmitted through an I2C interface or a dedicated receiver parameter information pin.

Figure 14:
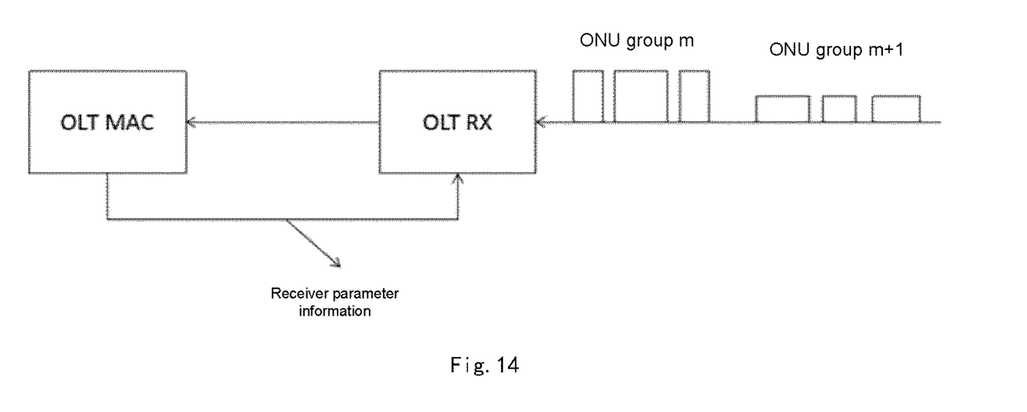
FIG. 14 is a schematic diagram of an OLT MAC sending receiver parameter information to an OLT receiver according to an optional embodiment of the present disclosure.

Specifically, FIG. 14 is a schematic diagram of an OLT MAC that sends receiver parameter information to an OLT receiver according to an optional embodiment of the present disclosure. As shown in FIG. 14, the OLT schedules, through DBA, ONU groups that reach the OLT receiver in a fixed order, for example, first group of ONUs, second group of ONUs, . . . , Nth group of ONUs, first group of ONUs, second group of ONUs, . . . . The OLT MAC sends the receiver parameter information to the OLT receiver. After receiving the receiver parameter information, the OLT receiver makes the receiver parameter configuration take effect.

In a working phase, the OLT pre-configures the receiver parameters of the corresponding ONU to the OLT receiver, and after the data of the ONU arrives, the data can be quickly converged, thereby realizing fast burst reception of the data.

Specifically, the OLT MAC sends information about a parameter look-up table of the OLT receiver to the OLT receiver through a communication interface with the OLT receiver, and the OLT receiver stores the information in a receiver register.

Specifically, FIG. 6 is a schematic diagram of an OLT MAC corresponding to a group indication signal for an OLT receiver according to an optional embodiment of the present disclosure. As shown in FIG. 6, the OLT MAC may know, according to a DBA, the group in which an ONU arriving at the receiver is located. After the data of the previous one or the previous group of ONUs ends, and before the next one or the next group of ONU data arrives, the OLT MAC sends a corresponding dividing indication signal to the OLT receiver, and the OLT receiver makes the configuration corresponding to the next one or the next group of receivers parameters take effect according to the indication signal. The indication signal may be transmitted through an I2C interface or a dedicated indication signal pin.

Specifically, FIG. 7 is a schematic diagram of an OLT MAC indicating to an OLT receiver an indication signal for updating a receiver parameter according to an optional embodiment of the present disclosure. As shown in FIG. 7, the OLT schedules, through DBA, ONU groups arriving at the OLT receiver according to a fixed order, for example, a first group of ONUs, a second group of ONUs, . . . , an Nth group of ONUs, a first group of ONUs, a second group of ONUs, . . . . An indication signal sent by an OLT MAC to an OLT receiver indicates the change of the receiver parameters, and the indication signal may be a pulse signal or a level jump signal. After receiving the indication signal, the OLT receiver configures and makes the next group of receiver parameters take effect.

Embodiment 4, FIG. 10 is a schematic diagram of N groups of receiver parameter specific values stored in an OLT MAC according to an optional embodiment of the present disclosure. As shown in FIG. 10, the N groups of receiver parameter specific values may be a look-up table stored in a register, which can be read and written by the OLT MAC or a MAC, on a system board, and the receiver parameters may include a TIA AGC gain, a TIA VGA gain, a BCDR phase parameter, an equalizer tap coefficient, and the like. The TIA is located in an OLT optical module optical receiver, and the BCDR and equalizer chip are located on an OLT system board.

Figure 15:
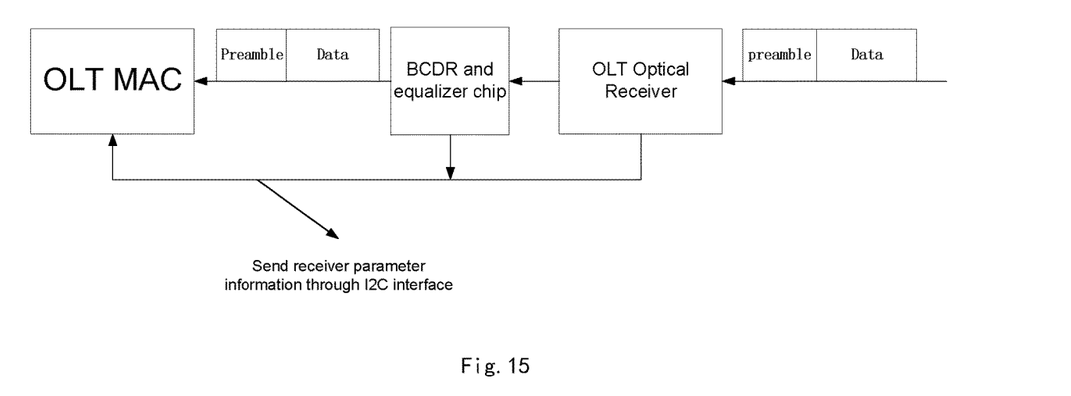
FIG. 15 is a schematic diagram of equalizer tap coefficients sent to an OLT MAC through an I2C structure of a chip according to an optional embodiment of the present disclosure.

In the registration phase, FIG. 15 is a schematic diagram of equalizer tap coefficients sent to an OLT MAC through an I2C structure of a chip according to an optional embodiment of the present disclosure. As shown in FIG. 15, the OLT performs burst reception on received ONU data, and obtains receiver parameters corresponding to the ONU, which may include a TIA AGC gain, a TIA VGA gain, a BCDR phase parameter, equalizer tap coefficients, and the like. The OLT optical receiver sends the converged and determined TIA parameters to the OLT MAC through the optical module I2C. The BCDR and equalizer chip receives the converged determined BCDR phase parameter, and the equalizer tap coefficient is sent to the OLT MAC via the I2C structure of the chip, and the OLT MAC classifies the ONU into a corresponding receiver parameter group according to the received receiver parameter.

In the working stage, the OLT pre-configures the receiver parameters of the corresponding ONU to the OLT receiver. After the data of the ONU arrives, the data can be converged quickly, so as to implement the fast burst reception of data.

Figure 16:
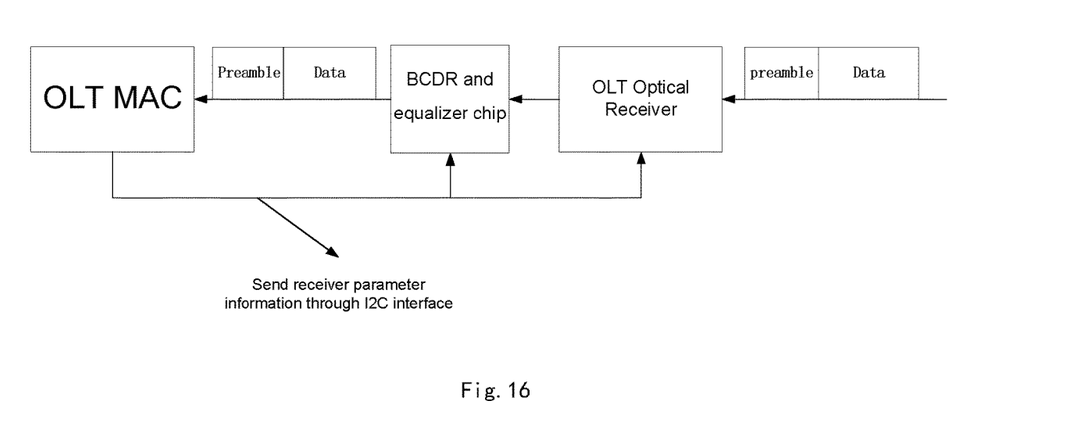
FIG. 16 is a schematic diagram of the OLT MAC sending corresponding parameters to the OLT optical receiver and the BCDR and equalizer chip according to an optional embodiment of the present disclosure.

Specifically, FIG. 16 is a schematic diagram of the OLT MAC issuing corresponding parameters to the OLT optical receiver, the BCDR and the equalizer chip according to an optional embodiment of the present disclosure. As shown in FIG. 16, the OLT MAC can know the group of the ONUs arriving at the receiver according to the DBA. After the previous one or the previous group of ONU data ends, and before the next one or the next group of ONU data arrives, the OLT MAC sends a corresponding TIA AGC gain and a TIA VGA gain to the OLT optical receiver through the I2C interface, and sends a corresponding BCDR phase parameter and equalizer tap coefficient to the BCDR and equalizer chip. The OLT optical receiver TIA chip, the BCDR chip and the equalizer chip take effect the parameter information configuration sent by the OLT MAC.

In conclusion, the above embodiments provide a fast adaptive burst receiving method to solve the problem of high uplink preamble overhead of the PON-system. The method specifically includes that ONUs are divided into N groups, and each group of ONUs corresponds to a group of OLT receiver parameters, which may specifically include a transimpedance gain, a clock frequency, a phase, an equalization coefficient, and the like. Before receiving the ONU data, the OLT pre-configures corresponding parameters to the OLT receiver. After the ONU data arrives at the OLT receiver, the OLT can receive the uplink data only by performing a fine adjustment or even without any adjustment, thereby accelerating the recovery time of the uplink burst reception and reducing the preamble overhead.

Embodiments of the present disclosure further provide a computer readable storage medium. The computer readable storage medium stores a computer program, wherein when the computer program is executed by a processor, cause the processor to implement the steps in the above method embodiments.

In an exemplary embodiment, the computer readable storage medium may include, but is not limited to, any medium that can store a computer program, such as a USB flash drive, a Read-Only Memory (ROM), a Random Access Memory (RAM), a removable hard disk, a magnetic disk, or an optical disc.

An embodiment of the present disclosure also provides an electronic device, comprising a memory and a processor, wherein the memory stores a computer program, and the processor is configured to execute the computer program so as to implement the steps in the above described method embodiments.

In an exemplary embodiment, the electronic apparatus can further comprise a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those skilled in the art should understand that each module or each step of the present disclosure can be implemented by a universal computing device, can be centralized on a single computing device or distributed on a network composed of a plurality of computing devices, and can be implemented by program codes executable by the computing devices. Thus, they can be stored in a storage apparatus and executed by the calculation apparatuses, the shown or described steps can be executed in a sequence different from this sequence under certain conditions, or they are made into integrated circuit modules respectively, or a plurality of modules or steps therein are made into a single integrated circuit module for implementation. Thus, the present disclosure is not limited to any specific combination of hardware and software.

The above description is only the preferred embodiments of the present disclosure, and is not intended to limit the present disclosure. For those skilled in the art, the present disclosure may have various modifications and variations. Any modifications, equivalent replacements, improvements and the like made within the principle of the present disclosure shall belong to the protection scope of the present disclosure.

What is claimed is:

1. A parameter configuration method for an OLT receiver, comprising:
   receiving, by an optical line terminal (OLT), uplink data sent by an optical network unit (ONU) in a burst manner, and obtaining a receiver parameter corresponding to the ONU in a registration phase;
   dividing, by the OLT, the ONU into corresponding receiver parameter group according to the receiver parameter; and
   enabling, by the OLT, uplink data of each ONU group to arrive at an OLT receiver in a predetermined order by scheduling a Dynamically Bandwidth Assignment (DBA), and pre-configuring, by the OLT, the receiver parameter corresponding to the ONU to the OLT receiver, and receiving uplink data of the ONU in a burst manner in a working phase.

2. The method according to claim 1, wherein dividing, by the OLT, the ONU into corresponding receiver parameter group according to the receiver parameter comprises:
   dividing the ONU into the corresponding receiver parameter group according to the receiver parameter determined after the OLT receiver convergence.

3. The method according to claim 2, wherein after dividing the ONU into the corresponding receiver parameter group according to the receiver parameter determined after the receiver convergence, the method further comprises:
   sending, by the OLT receiver, the group number of the receiver parameter to an OLT MAC.

4. The method according to claim 3, wherein sending, by the OLT receiver, the group number of the receiver parameter to an OLT MAC comprises one of the following:
   inserting, by the OLT receiver, the group number of the receiver parameter into a
   preamble sequence of uplink data, and sending the uplink data to the OLT MAC;
   sending, by the OLT receiver, a first indication signal to the OLT MAC, wherein the first indication signal indicates a group number corresponding to the ONU of which uplink data arrives the OLT MAC.

5. The method according to claim 4, wherein after sending, by the OLT receiver, the group number of the receiver parameter to the OLT MAC, the method further comprises:
   extracting, by the OLT MAC, the group number and an ONU ID of the ONU, and storing a corresponding relation between the group number and the ONU ID in a MAC register.

6. The method according to claim 3, wherein configuring, by the OLT, the receiver parameter corresponding to the ONU to an OLT receiver comprises:
   obtaining, by the OLT MAC, the group number of the ONU of which the uplink data arrives at the OLT receiver according to the DBA;
   sending, by the OLT MAC, corresponding receiver parameter information to the OLT receiver after an uplink data transmission of a previous ONU or a previous group of ONUs ends and before an uplink data transmission of a next ONU or a next group of ONUs arrives; and
   making, by the OLT receiver, configuration of a next one or a next group of corresponding receiver parameters take effect according to the receiver parameter information.

7. The method according to claim 6, wherein configuring, by the OLT, the receiver parameter corresponding to the ONU to an OLT receiver comprises:
   sending, by the OLT MAC, a second indication signal to the OLT receiver to indicate the OLT receiver to change receiver parameters of each ONU group in the predetermined order; and
   making, by the OLT receiver, the receiver parameter configuration of the next group of ONUs take effect according to the second indication signal.

8. The method according to claim 1, wherein the receiver parameter of the ONU at least comprises one of the following:
   a Trans-Impedance Amplifier (TIA) Automatic Gain Control (AGC) gain, a TIA Variable Gain Amplifier (VGA) gain, a Burst Clock Data Recovery (BCDR) phase parameter, an equalizer tap coefficient.

9. An optical line terminal (OLT), comprising:
   an OLT receiver, configured to perform burst receiving on uplink data sent by an optical network unit (ONU), obtain a receiver parameter corresponding to the ONU, and divide the ONU into corresponding receiver parameter groups according to the receiver parameter in a registration phase; and
   an OLT MAC, configured to enable the uplink data of each ONU group to arrive at the OLT receiver in a predetermined order by scheduling a Dynamically Bandwidth Assignment (DBA), and pre-configure the receiver parameters corresponding to the ONU to the OLT receiver, and receive uplink data of the ONU in a burst manner in a working phase.

10. The OLT according to claim 9, wherein,
    the OLT receiver is further configured to send a group number of the receiver parameter to the OLT MAC.

11. The OLT according to claim 10, wherein the OLT receiver sends the group number by one of the following manners:
    inserting the group number of the receiver parameter into a preamble sequence of uplink data and sending the uplink data to the OLT MAC;
    sending a first indication signal to the OLT MAC, wherein the first indication signal indicates the group number corresponding to the ONU which uplink data arrives at the OLT MAC.

12. The OLT according to claim 11, wherein,
    the OLT MAC is further configured to extract the group number and the ONU ID, and store a corresponding relationship between the group number and the ONU ID in a MAC register.

13. The OLT according to claim 10, wherein the first indication signal is sent through one of the following interfaces: an Inter-Integrated Circuit (I2C) interface, a Management Data Input/Output (MDIO) interface, a self-defined interface, an indication pin.

14. The OLT according to claim 9, wherein,
    the OLT MAC is further configured to acquire, according to the DBA, the group number of the ONU of which the uplink data arrives at the OLT receiver, and after the uplink data transmission of a previous ONU or a previous group of ONUs ends, and before the uplink data transmission of a next ONU or a next group of ONUs arrives, send corresponding receiver parameter information to the OLT receiver;

the OLT receiver is further configured to make a next corresponding receiver parameter configuration or a next group of corresponding receiver parameters take effect according to the receiver parameter information.

15. The OLT according to claim 9, wherein, the OLT MAC is further configured to send a second indication signal to the OLT receiver for indicating the OLT receiver to change a receiver parameter of each ONU group in the predetermined order; and the OLT receiver is further configured to make a receiver parameter configuration of a next group of ONUs take effect according to the second indication signal.

16. The OLT according to claim 9, wherein the receiver parameter of the ONU comprises at least one of:

a Trans-Impedance Amplifier (TIA) Automatic Gain Control (AGC) gain, a TIA Variable Gain Amplifier (VGA) gain, a Burst Clock Data Recovery (BCDR) phase parameter, equalizer tap coefficient.

17. The OLT according to claim 9, wherein the receiver parameter group is stored in a look-up table of the OLT receiver, or stored in a look-up table of the OLT MAC, or stored in a look-up table of a register, which can be read and written by the OLT MAC, on a system board of the OLT.

18. A non-transitory computer readable storage medium, wherein the computer readable storage medium stores a computer program, and when the computer program is executed by a processor, causes the processor to:

receive uplink data sent by an optical network unit (ONU) in a burst manner, and obtaining a receiver parameter corresponding to the ONU in a registration phase;

divide the ONU into corresponding receiver parameter group according to the receiver parameter; and enable, by the OLT, uplink data of each ONU group to arrive at an OLT receiver in a predetermined order by scheduling a Dynamically Bandwidth Assignment (DBA), and pre-configure the receiver parameter corresponding to the ONU to the OLT receiver, and receiving uplink data of the ONU in a burst manner in a working phase.

19. An electronic apparatus, comprising a memory, a processor, and a computer program stored on the memory, the processor is configured to execute the computer program to:

receive uplink data sent by an optical network unit (ONU) in a burst manner, and obtaining a receiver parameter corresponding to the ONU in a registration phase;

divide the ONU into corresponding receiver parameter group according to the receiver parameter; and enable, by the OLT, uplink data of each ONU group to arrive at an OLT receiver in a predetermined order by scheduling a Dynamically Bandwidth Assignment (DBA), and pre-configure the receiver parameter corresponding to the ONU to the OLT receiver, and receiving uplink data of the ONU in a burst manner.

* * * * *